United States Patent [19]

Ogasawara et al.

[11] 4,297,634
[45] Oct. 27, 1981

[54] DEVICE FOR MEASURING THE AMOUNT OF MOVEMENT OF A STRAIGHTLY MOVING OBJECT

[76] Inventors: Hiroomi Ogasawara, 3821-4; Masaomi Ogasawara, 3833, both of Yamakita, Yamakitamachi, Ashigarakami-Gun, Kanagawa-Ken, Japan

[21] Appl. No.: 99,154

[22] Filed: Nov. 30, 1979

[30] Foreign Application Priority Data

Dec. 4, 1978 [JP] Japan .................. 53-149837

[51] Int. Cl.$^3$ .................................. G01R 27/26
[52] U.S. Cl. .............................. 324/61 R; 324/61 QS
[58] Field of Search ............ 324/61 R, 61 P, 61 QS

[56] References Cited

U.S. PATENT DOCUMENTS

| | | |
|---|---|---|
| 2,611,964 | 9/1952 | Buisson .................. 324/61 R X |
| 2,613,249 | 10/1952 | Babb . |
| 2,925,590 | 2/1960 | Boltinghouse et al. ...... 324/61 P |
| 3,146,394 | 8/1964 | Frisch .................... 324/61 R X |
| 3,219,925 | 11/1965 | Borley et al. ............. 324/61 R |
| 3,221,256 | 11/1965 | Walden ..................... 324/61 P |
| 3,222,591 | 12/1965 | Mynall .................... 324/61 R X |
| 3,227,952 | 1/1966 | Proebster et al. . |
| 3,237,447 | 3/1966 | McKeown . |
| 3,487,402 | 12/1969 | Hillhouse . |
| 3,523,246 | 8/1970 | Hall et al. ................ 324/61 R |
| 3,702,467 | 11/1972 | Melnyk . |
| 3,723,866 | 3/1973 | Michaud et al. ........... 324/61 R |
| 3,845,377 | 10/1974 | Shimotori ................ 324/61 R X |
| 3,860,918 | 1/1975 | Cencel . |
| 3,873,916 | 3/1975 | Sterki ..................... 324/61 R |
| 3,938,077 | 2/1976 | Nakanishi et al. . |
| 3,961,318 | 6/1976 | Farrand et al. ........... 324/61 R X |
| 3,990,005 | 11/1976 | Abbe et al. . |

*Primary Examiner*—Stanley T. Krawczewicz
*Attorney, Agent, or Firm*—Beveridge, DeGrandi, Kline & Lunsford

[57] ABSTRACT

A device for measuring the amount of movement of a straightly moving object is provided with a sensor unit made up of the straightly moving object and stationary members arranged to form two pairs of capacitors therebetween. The confronting surfaces of the moving object and stationary members are graduated with gear-like cuts so that while the capacitances of two of the capacitors are maximum, the capacitance of the other capacitors are minimum. The device further comprises a pair of oscillators coupled to the two pairs of capacitors, and a mixer connected to the oscillators so that the difference in capacitance between the capacitors is obtained as the difference in frequency, which is processed to provide the amount of movement of the moving object.

6 Claims, 6 Drawing Figures

F I G. 1
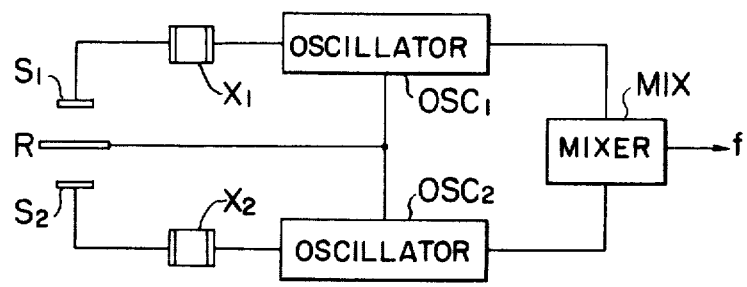
F I G. 2
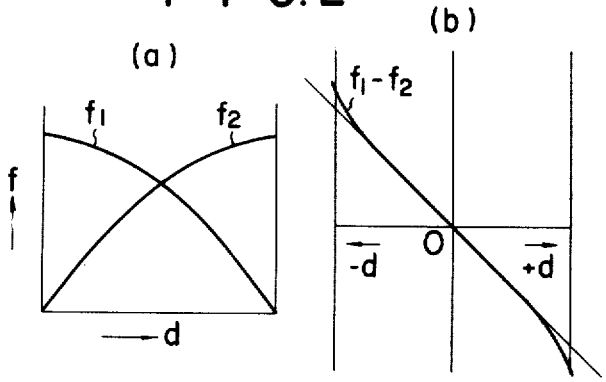
F I G. 3
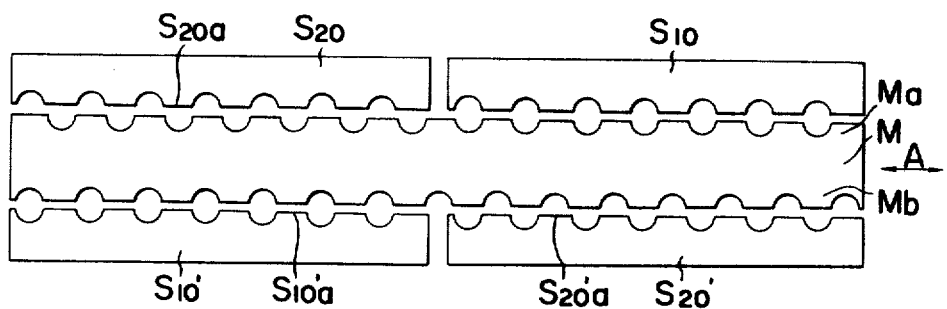

F I G. 4
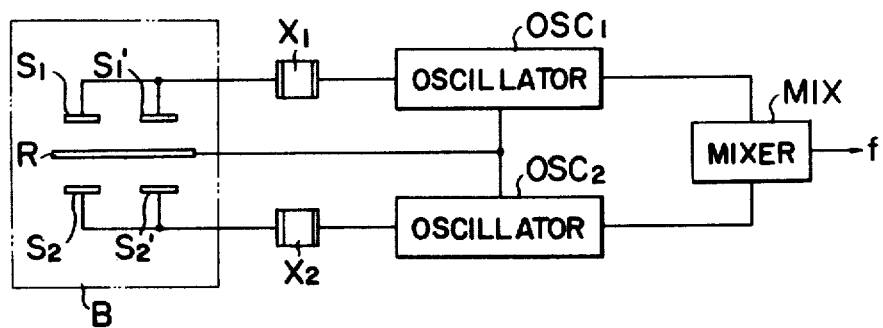
F I G. 5
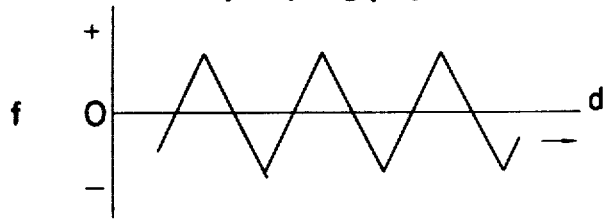
F I G. 6
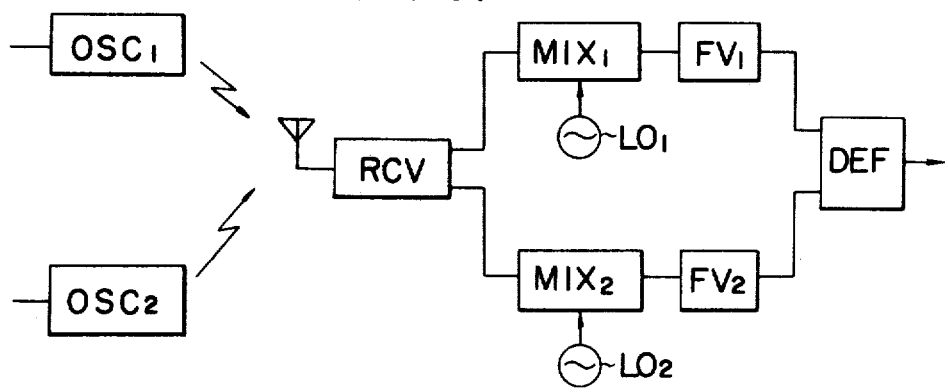

DEVICE FOR MEASURING THE AMOUNT OF MOVEMENT OF A STRAIGHTLY MOVING OBJECT

BACKGROUND OF THE INVENTION

This invention relates to a device for electrically measuring the amount of movement of a straightly moving object.

For instance, the amount of movement of a straightly moving object can be, in general, detected by a method in which the moving object is graduated in equal spaces, and the amount of movement of the straightly moving object is obtained by reading the graduations.

In the case where the amount of movement should be read with high precision, it is assumed that the reading is effected by microns. Then, the confronting surfaces of the moving object and the stationary members must be graduated by the unit of microns.

However, such graduation is practically impossible. Accordingly, a device for measuring the amount of movement with high accuracy has not been proposed yet.

SUMMARY OF THE INVENTION

Accordingly, an object of this invention is to provide a device which is capable of measuring the amount of movement of a straightly moving object with a high accuracy of the order of less than one micron.

This object and other objects of the invention have been achieved by providing a device for measuring the amount of movement of a straightly moving object, in which one moving object and an even multiple of stationary members are provided in such a manner that the moving object confronts the stationary members to form two pairs of capacitors which are coupled respectively to oscillators, and the confronting surfaces of the moving object and the stationary members are graduated with gear-like cuts so that while the capacitance of one of the capacitors is increased, the capacitance of the other is decreased, in a differential mode.

Owing to this arrangement, a signal whose frequency is linearly increased and decreased in succession with the movement of the moving object can be obtained. The amount of movement of the moving object can be obtained with high accuracy if the signal is counted as it is, or after it is, divided into parts or if it is processed in other methods.

The differential graduations are employed according to the invention. Therefore, if the relative positional relationships between the moving object and the two pairs of stationary members confronting the moving object are individually detected and then combined, a signal which is the average of the two relative position outputs can be obtained. Therefore, even if the graduations are made somewhat erroneously, the effect of the error is minimized.

The principle, nature and utility of the invention will become more apparent from the following detailed description when read in conjunction with the accompanying drawings.

BRIEF DESCRIPTION OF THE DRAWINGS

In the accompanying drawings:

FIG. 1 is a block diagram illustrating the principle of this invention;

The parts (a) and (b) of FIG. 2 are graphical representations illustrating the operating principle of the device according to the invention;

FIG. 3 is an explanatory diagram showing one example of the sensor unit according to this invention;

FIG. 4 is a block diagram showing a circuit used in combination with the sensor unit shown in FIG. 3;

FIG. 5 is a graphical representation indicating the output characteristic curve of the circuit shown in FIG. 1; and FIG. 6 is a block diagram showing another example of the circuit employed in the invention.

DETAILED DESCRIPTION OF THE INVENTION

FIG. 1 shows one example of a circuit illustrating the principle of this invention. In the circuit, crystal resonators $X_1$ and $X_2$ are used in combination with oscillators $OSC_1$ and $OSC_2$, respectively. Originally, the oscillating frequency of a crystal resonator is fixed. However, in this case, the crystal resonators are connected in parallel to the capacitors formed by the rotating object R and the stationary members $S_1$ and $S_2$, and therefore the oscillating frequency of each crystal resonator is varied as much as the variation in capacitance of the respective capacitor. The variation in capacitance of the capacitors is a so-called "differential variation," in which while the capacitance of one capacitor is increased, the capacitance of the other capacitor is decreased. Accordingly, while the oscillating frequency of one of the oscillators $OSC_1$ and $OSC_2$ is increased, that of the other is decreased. If these two frequency signals are mixed with each other in a mixer MIX, then the difference frequency f between them can be obtained. The difference signal is transmitted to a signal processing circuit by wire or wireless communication.

The parts (a) and (b) of FIG. 2 are graphical representations indicating the outputs of the oscillators $OSC_1$ and $OSC_2$ and the output of the mixer MIX, which are provided as the rotating object R is rotated with respect to the stationary members $S_1$ and $S_2$. For convenience in description, a relative average distance d between the rotating object R and the stationary members $S_1$ and $S_2$ will be employed. As the rotating object R is rotated approximately one graduation with respect to the stationary members $S_1$ and $S_2$, the output frequencies $f_1$ and $f_2$ of the oscillators $OSC_1$ and $OSC_2$ change non-linearly as indicated in the part (a) of FIG. 2. It should be noted that the variations of the output frequencies $f_1$ and $f_2$ are symmetrical. If a characteristic curve $(f_1 - f_2)$ is obtained from the variations of the output frequencies, then it includes a substantially linear portion as indicated in FIG. 1.

Shown in FIG. 3 is one example of the sensor unit, according to this invention which comprises a moving object M and stationary members S10, S10', S20 and S20'. In this case, the moving object M is moved straightly in the direction of the arrow A. The moving object M has gear-like graduations Ma and Mb cut in both sides. The gear-like graduation Ma is different by 180° in phase from the gear-like graduation Mb. The circuit shown in FIG. 4 is used for this sensor unit.

The stationary members S10 and S10' have gear-like graduations S10a and S10'a which are in phase with each other with respect to the graduations Ma and Mb. Similarly, the stationary members S20 and S20' have gear-like graduations S20a and S20'a which are in phase with each other with respect to the graduations Ma and Mb. However, it should be noted that the graduations S10a and S20a of the stationary members S10 and S20 are different by 180° in phase from each other with respect to the graduation Ma, and similarly the graduations S10'a and S20'a of the stationary members S10' and S20'a are different by 180° in phase from each other with respect to the graduation Mb.

Therefore, if the moving object M and the stationary members S10, S10', S10', S20 and S20' are arranged to form capacitors, then when the capacitance between the moving object M and the stationary members S10 and S10' is maximal, the capacitance between the moving object M and the stationary members S20 and S20' is minimal. The stationary members S10 and S10' are connected together, and the stationary members S20 and S20' are connected together. Therefore, even if the distances between the moving object M and the stationary members S10 and S20 are different from the distances between the moving object M and the stationary members S10' and S20', the difference can be cancelled in capacitance. This can be applied to the case where the moving object M is rotated in inclination state.

In the example also, measurement errors attributed to the eccentricity and inclination of the moving object are scarcely caused. Thus, the amount of rotation can be measured with high precision.

FIG. 4 shows a measurement circuit including the sensor unit connected as described above. Crystal resonators $X_1$ and $X_2$ are used in combination with oscillators $OSC_1$ and $OSC_2$, respectively. The oscillating frequency of each of the crystal resonators $X_1$ and $X_2$ is fixed. However, since the crystal resonators are coupled in series to the capacitors formed by the moving object R and the stationary members S1, S1' and S2 and S2', the oscillating frequencies of the crystal resonators are changed as the capacitance of the capacitors change with the rotation of the moving object. The variations in capacitance the capacitors are of a so-called "differential variation," in which while the capacitance of one capacitor is increased, the capacitance of the other is decreased. Accordingly, while the oscillating frequency of one of the oscillators $OSC_1$ and $OSC_2$ is increased, that of the other is decreased. If these two frequency signals are mixed with each other in a mixer MIX, then the difference frequency f between them can be obtained. The variations of the difference frequency f is as indicated in FIG. 5.

With this example, measurement errors attributed to the eccentricity and inclination of the moving object are scarcely caused. Thus, the amount of rotation can be measured with high accuracy.

FIG. 5 shows the continuous variation of the difference frequency signal f with the movement of the moving object R. As the moving object moves, the difference frequency is increased at a graduation pitch, but it is decreased at the next graduation pitch. It is necessary to linearly increase and decrease the frequency. This can be achieved by suitably selecting the configurations of the gear-like cuts, i.e., the recesses and protrusions of the moving object R and the stationary members $S_1$ and $S_2$.

As the frequency is repeatedly increased and decreased linearly, one graduation pitch can be divided into equal parts. Accordingly, the reading can be accomplished with much more precision than that of the graduation pitch. For instance, it is assumed that the graduation pitch is of a unit of one millimeter. If, in this case, this graduation pitch is divided into one hundred parts, then the reading can be made by the unit of microns. If the graduation pitch can be divided into more parts, then the pitch intervals can be made to be longer.

FIG. 6 shows another method of processing the outputs of the oscillators $OSC_1$ and $OSC_2$. The outputs of the two oscillators are applied through one receiver RCV to mixers $MIX_1$ and $MIX_2$, where they are mixed with local oscillation frequencies $LO_1$ and $LO_2$ for frequency conversion, respectively. Each of the two output signals of the mixers is applied to frequency-voltage converters $FV_1$ and $FV_2$ so that each of the signals is converted to voltage signals. The voltage signals are applied to a differential amplifier DEF to provide voltage difference signals which represent the frequency difference between oscillators $OSC_1$ and $OSC_2$.

The problems that, when the difference between the output frequencies of the oscillators $OSC_1$ and $OSC_2$ is several KHz, the signal interval is 0.2 to 0.3 millisecond which cannot follow the movement of continuously moving object, and when a frequency of 10 to 20 MHz, readily obtained as the output frequencies of the oscillators $OSC_1$ and $OSC_2$, is used as it is, the frequency is unsuitable for a frequency-to-voltage converter, can be solved by the arrangement shown in FIG. 6. That is, the difficulty that as the signal interval is of the order of microseconds, several KHz which is the signal variation is included in a range of error, can be eliminated.

What is claimed is:

1. A device for measuring the amount of movement of a straightly moving object comprising:
   (a) sensor means including (i) an elongated electrode member having gear-like graduations cut on two longitudinal outer walls thereof, (ii) a first pair of electrode plate members having gear-like graduations confronting respectively the graduations on said two longitudinal walls of said elongated electrode member to form therewith a first pair of capacitors, the relation of the graduations on the confronting surface of a first one of said first pair of electrode plate members and the graduations on its respective longitudinal wall of said elongated electrode member being shifted 180° in phase from the relation of the graduations on the confronting surface of the other one of said first pair of electrode plate members and the graduations on its respective longitudinal wall of said elongated electrode member, and (iii) a second pair of electrode plate members having gear-like graduations confronting respectively the graduations on said two longitudinal walls of said elongated electrode member to form therewith a second pair of capacitors, the relation of the graduations on the confronting surface of a first one of said second pair of electrode plate members and the graduations on its respective longitudinal wall of said elongated electrode member being the same as the relation of the graduations on the confronting surface of the first one of said first pair of electrode plate members and the graduations on its respective longitudinal wall of said elongated electrode member and being shifted 180° in phase from the relation of the graduations on the confronting surface of the other one of said second pair of electrode plate members and the graduations on its respective longitudinal wall of said elongated electrode member;
   one of (i) said elongated electrode member and (ii) said first and second pairs of electrode plate members being adapted to move longitudinally in response to longitudinal movement of the straightly moving object while the other one thereof is stationary, so that the capacitance of a first capacitor of each of said pairs of capacitors increases and the capacitance of the othercapacitor of each of said pairs of capacitors correspondingly decreases differentially as said straightly moving object moves longitudinally;

(b) two oscillator circuits, one oscillator circuit having said first one of said first pair of capacitors and said first one of said second pair of capacitors incorporated therein as frequency varying components, the other oscillator circuit having said second one of said first pair of capacitors and said second one of said second pair of capacitors incorporated therein as frequency varying components; and (c) mixer means connected to said two oscillator circuits for providing a frequency difference signal determined by the difference in the frequencies of said two oscillator circuits and indicative of the extent of longitudinal movement of the straightly moving object.

2. A device as claimed in claim 1 in which said elongated electrode member is adapted to move longitudinally in response to longitudinal movement of the straightly moving object and said electrode plate members are stationary.

3. A device as claimed in claim 1 in which said electrode plate members are adapted to move longitudinally in response to longitudinal movement of the straightly moving object and said elongated electrode member is stationary.

4. A device as claimed in claim 1 in which the frequency of said mixer means is increased and decreased linearly with every unitary amount of longitudinal movement of said straightly moving object.

5. A device as claimed in claim 1 further comprising means for transmitting the outputs of said oscillators by wireless communication.

6. A device as claimed in claim 1 further comprising a source of local oscillation frequencies connected to said mixer means for subjecting the outputs of said oscillators to frequency conversion to obtain new frequency signals, and means for obtaining the difference frequency signal between said frequency signals.

* * * * *